United States Patent [19]
Nakano et al.

[11] Patent Number: 5,970,033
[45] Date of Patent: Oct. 19, 1999

[54] TRACKING CONTROL UNIT FOR OPTICAL DISK DRIVE CAPABLE OF SUPPRESSING CONTROL RESIDUAL DERIVED FROM DISTURBANCE

[75] Inventors: Junichi Nakano, Hino; Takeru Hokkezu, Hachioji, both of Japan

[73] Assignee: Olympus Optical Co., Ltd., Tokyo, Japan

[21] Appl. No.: 08/928,470

[22] Filed: Sep. 12, 1997

[51] Int. Cl.⁶ ........................................ G11B 7/09
[52] U.S. Cl. ........................ 369/44.29; 369/44.32
[58] Field of Search ..................... 369/44.29, 44.35, 369/44.28, 44.25, 44.36, 54, 44.32, 44.11, 44.21, 44.22, 44.34

[56] References Cited

U.S. PATENT DOCUMENTS

| | | | |
|---|---|---|---|
| 5,581,521 | 12/1996 | Nomura et al. | 369/32 |
| 5,610,885 | 3/1997 | Takahashi | 369/44.28 |
| 5,633,846 | 5/1997 | Okuyama et al. | 369/44.34 |
| 5,757,747 | 5/1998 | Shimada | 369/44.28 |
| 5,872,439 | 2/1999 | Nomura | 369/44.14 |

FOREIGN PATENT DOCUMENTS

| | | |
|---|---|---|
| 63-224037 | 9/1988 | Japan . |
| 5-134707 | 6/1993 | Japan . |
| 6-139588 | 5/1994 | Japan . |

*Primary Examiner*—Thang V. Tran
*Attorney, Agent, or Firm*—Armstrong, Westerman, Hattori, McLeland & Naughton

[57] ABSTRACT

A tracking control unit for an optical disk drive comprises a TES detection circuit for detecting a tracking error signal (TES) in an output of a photodetector included in a stationary optical system, a frictional state prediction circuit for predicting a frictional state between guide shafts and a carriage on the basis of the TES detected by the TES detection circuit, a phase compensation filter for compensating for a phase difference of the TES detected by the TES detection circuit so as to stabilize a tracking control system on the basis of the result of the prediction performed by the frictional state prediction circuit, and a driver for moving the carriage in a direction in which a tracking error can be corrected for according to an output of the phase compensation filter and for thus controlling tracking.

4 Claims, 16 Drawing Sheets

TRACKING CONTROL UNIT FOR OPTICAL DISK DRIVE CAPABLE OF SUPPRESSING CONTROL RESIDUAL DERIVED FROM DISTURBANCE

BACKGROUND OF THE INVENTION

1. Field of the Invention

The present invention relates to a tracking control unit for an optical disk drive capable of controlling tracking using an actuator of a fine-and-coarse driving integrated type.

2. Description of the Related Art

For realizing cost reduction for an optical disk drive, a method using the thrust of the same coil to control both tracking and access is effective. Specifically, as disclosed in Japanese Unexamined Patent Publication No. 63-224037, one tracking actuator is used for both fine driving and coarse driving instead of including a fine-driving actuator (designed for controlling tracking and movable in a narrow range) and a coarse-driving actuator (designed for controlling access and movable in a wide range).

For materializing such an actuator of a fine-and-coarse driving integrated type, a bearing may be placed between guide rails for supporting a carriage having a focus actuator and reflection mirror mounted thereon. In this case, there arises problems that a movable portion becomes large in size, a weight increases, and a resonant frequency for a high-order mode of resonance falls accordingly. A support for the carriage is therefore designed to be of a sliding type (sliding bearing) in practice.

When a bearing is of the sliding type, every time the carriage moves, frictional force works on the carriage and guide rails. When frictional force is present, a phenomenon that a deviation remains with a control residual derived from frictional force and driving force generated by a tracking servo system against the control residual balanced takes place. The residual is referred to as an individual frictional distance.

When tracking is controlled in an optical disk drive, a control residual corresponding to the individual frictional distance is observed at two points during one rotation of a disk depending on an eccentric state of a track.

To be more specific, as shown in FIG. 17, since information tracks on an optical disk are generally eccentric, when the disk is rotated, a certain information track is seen shifting in a direction substantially orthogonal to the tracks according to a rotational frequency ("eccentric position" in FIG. 17). Owing to tracking control, a light beam attempts to follow the eccentricity. As shown in "eccentric speed" in FIG. 17, when a moving speed is zero, that is, when a magnitude of eccentricity reaches peak, a state of static friction is attained. A control residual therefore increases transiently ("control residual" in FIG. 17). In some eccentric state, a residual may occur at many instants of time.

A control residual of a certain magnitude adversely affects the data writing/reading characteristic of an optical disk drive.

A way of reducing the residual is to increase a loop gain of a tracking control system. It is difficult for an actuator of a fine-and-coarse driving integrated type to set the resonant frequency for a high-order mode of resonance to a high frequency for structural reasons. Since it is hard to raise a frequency band to which servo system is sensitive, it is difficult to increase the loop gain.

By the way, for coping with a phenomenon that a residual resulting from tracking control increases transiently due to vibration or the like, a method in which when a window comparator or the like detects that the control residual becomes equal to or larger than a given value, a gain to be produced by a control system is increased is known. One approach has been disclosed in Japanese Unexamined Patent Publication No. 6-139588.

However, the approach described in the Japanese Unexamined Patent Publication No. 6-139588 is intended to reset a moving device for a short period of time when a relatively large residual such as a servo failure derived from external vibration or a flaw on a disk occurs or when a servo loop is disabled. It is difficult to suppress a relatively small residual such as a transient increase in control residual derived from friction which is critical for an actuator of a fine-and-coarse driving integrated type supported by a sliding bearing.

For suppressing a small residual, a threshold is lowered so that a servo system can sensitively react on the small residual. In the approach described in the Japanese Unexamined Patent Publication No. 6-139588, judgment is made from the level of a residual alone. In case a tracking control system oscillates due to an increase in gain, since a tracking error signal whose level gets higher because of oscillation is detected, the gain remains increased. Consequently, the oscillation may be maintained.

Furthermore, in general, the tracking control system is susceptible to the state of a disk employed. For example, the distortion of a tracking error signal occurring at a pre-pit area or the occurrence frequency of a control residual derived from the eccentricity of the disk depends greatly on the state of a disk. When an attempt is made to design the tracking control system so that it can tolerate such factors and be kept off malfunctions including oscillation, if the approach described in the Japanese Unexamined Patent Publication No. 6-139588 is adopted, since a threshold must be set to a large value, the ability to suppress a microscopic control residual such as a residual derived from friction hardly works.

OBJECTS AND SUMMARY OF THE INVENTION

An object of the present invention is to provide a tracking control unit for an optical disk drive capable of effectively suppressing only a control residual derived from friction without oscillating despite the employment of an actuator that may bring about the control residual derived from friction, such as, an actuator of a fine-and-coarse driving integrated type supported by a sliding bearing.

Another object of the present invention is to provide a head positioning control unit for an optical disk drive capable of raising a frequency band to which a disturbance observer is sensitive for prediction despite the employment of an actuator for which it is difficult to raise the resonant frequency for a high-order mode of resonance, such as, an actuator of a fine-and-coarse driving integrated type, and capable of providing a stable servo loop for tracking without an increase in cost.

In addition to a tracking actuator for shifting the position of laser light irradiated onto an optical disk in a radial direction of the optical disk, a tracking control unit for an optical disk drive in accordance with the present invention comprises a tracking error signal detecting means for detecting a tracking error signal indicating a displacement of the laser light from an information track on the optical disk, a disturbance sensing means for inputting at least the tracking error signal and sensing a disturbed state, and a tracking control correcting means for controlling tracking by feeding back the tracking error signal to coils, and correcting tracking control on the basis of an output of the disturbance sensing means.

Other features and advantages of the present invention will be apparent from the description below.

BRIEF DESCRIPTION OF THE DRAWINGS

FIG. 1 is a diagram showing the configuration of an optical disk drive having a tracking control unit;

FIG. 2 is an oblique view showing the appearance of a carriage and focus actuator shown in FIG. 1;

FIG. 3 is an oblique view showing a state in which the carriage and the focus actuator in FIG. 2 having guide shafts are assembled together with magnetic circuits;

FIG. 4 is a block diagram showing the configuration of a phase compensation filter for the tracking control unit shown in FIG. 1;

FIG. 5 is a block diagram showing the configuration of a frictional state prediction circuit for the tracking control unit shown in FIG. 1;

FIG. 6 is a timing chart for explaining the operation of the tracking control unit shown in FIG. 1;

FIG. 7 is a block diagram showing the configuration of a head positioning control unit;

FIG. 8 is a first explanatory diagram for explaining the configuration of a tracking actuator shown in FIG. 7;

FIG. 9 is a second explanatory diagram for explaining the configuration of the tracking actuator shown in FIG. 7;

FIG. 10 is a functional block diagram showing a functional block equivalent to a control system in a positioning control unit shown in FIG. 7;

FIG. 11 is a flowchart for explaining the operation of the positioning control unit shown in FIG. 7;

FIG. 12 is a block diagram showing the configuration of a head positioning control unit;

FIG. 13 is a functional block diagram showing a functional block equivalent to a control system in the positioning control unit shown in FIG. 12;

DESCRIPTION OF THE PREFERRED EMBODIMENTS

Figure 1:
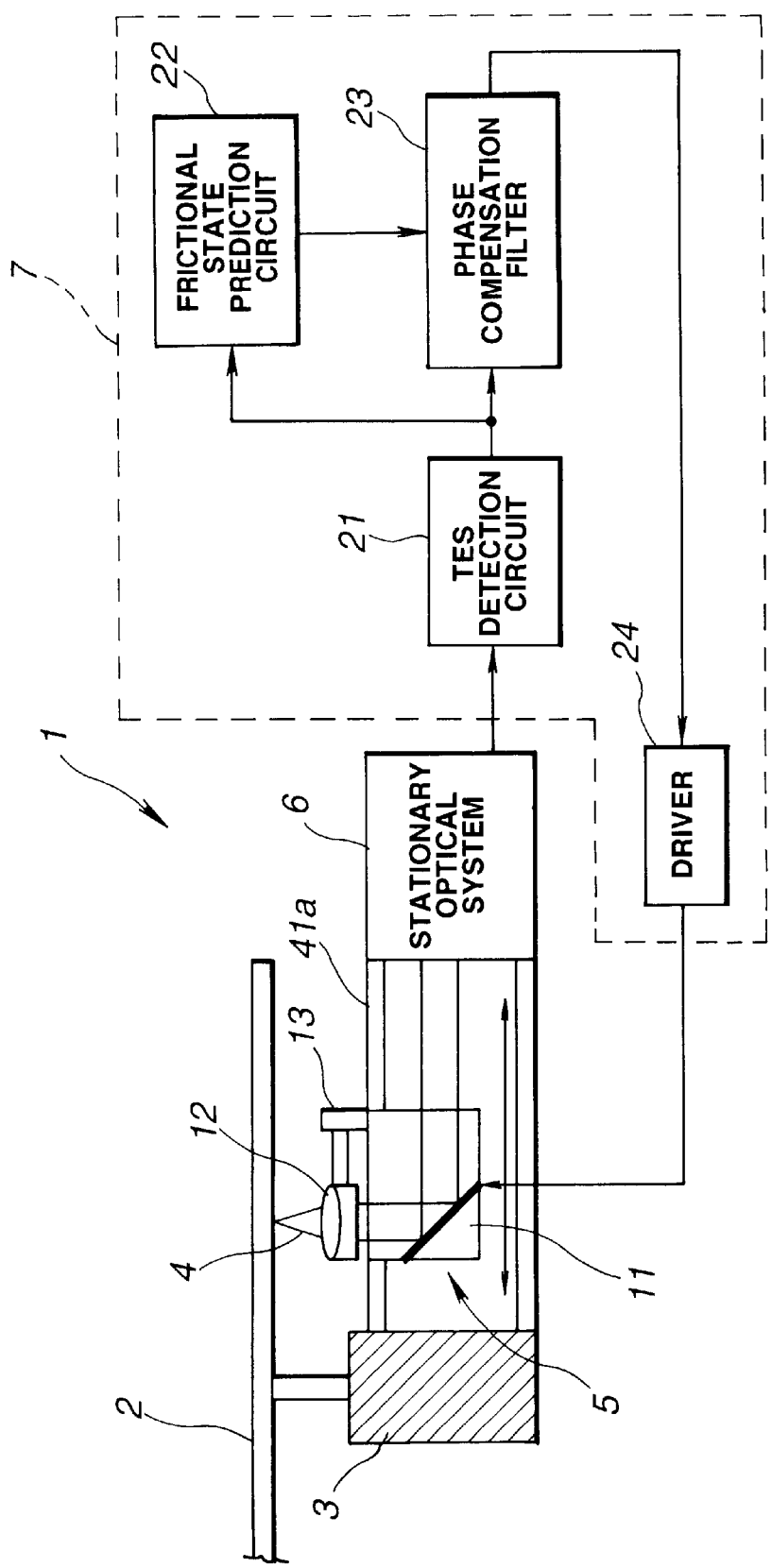
FIGS. 1 to 6 relate to the first embodiment of the present invention.

First Embodiment
  Configuration
  An optical disk drive 1 comprises, as shown in FIG. 1, a spindle motor 3 for rotating an optical disk 2 having information tracks thereon, a movable optical system 5 for irradiating a light beam 4 to the optical disk, a stationary optical system 6 including a laser diode serving as a light source of the light beam 4 for supplying laser light and a photodetector for detecting light returned from the optical disk 2 using the movable optical system 5, and a tracking control unit 7 for controlling tracking by detecting a tracking error signal (TES) in an output of the photodetector in the stationary optical system 6. Only the components of the optical disk drive 1 relevant to the tracking control unit 7 of this embodiment are shown in FIG. 1. The description of components having no relation to this embodiment will be omitted because they are well-known.

The movable optical system 5 is formed as a carriage 11 moving in a radial direction of the optical disk 2 along guide shafts that will be described later. The movable optical system 5 includes an objective lens 12 for converging laser light supplied from the stationary optical system 6 at an information track on the optical disk 2 and thus irradiating the laser light as a light beam 4, and a focus actuator 13 for driving the objective lens 12 in an optical-axis direction (vertical direction in FIG. 1).

The tracking control unit 7 of this embodiment includes a TES detection circuit 21 for detecting a tracking error signal (TES) in an output of the photodetector in the stationary optical system 6, a frictional state prediction circuit 22 serving as a frictional state predicting means for predicting a frictional state between the guide shafts and carriage 11 on the basis of the tracking error signal detected by the TES detection circuit 21, a phase compensation filter 23 for compensating for a phase difference of the tracking error signal detected by the TES detection circuit 21 so as to stabilize a tracking control system according to the result of the prediction performed by the frictional state prediction circuit 22, and a driver 24 for controlling tracking by moving the carriage 11 in a direction, in which a tracking error is corrected for, according to an output of the phase compensation filter 23.

With a current supplied from the driver 24, the carriage 11 having the focus actuator 13 mounted thereon can move in a direction in which the carriage traverses the information tracks on the optical disk 2 (lateral direction in FIG. 1, that is, the radial direction of the optical disk) so that the light beam 4 can be irradiated to all information tracks. The surroundings of the carriage 11 and focus actuator 13 are, for example, constructed as shown in FIG. 2.

Figure 2:
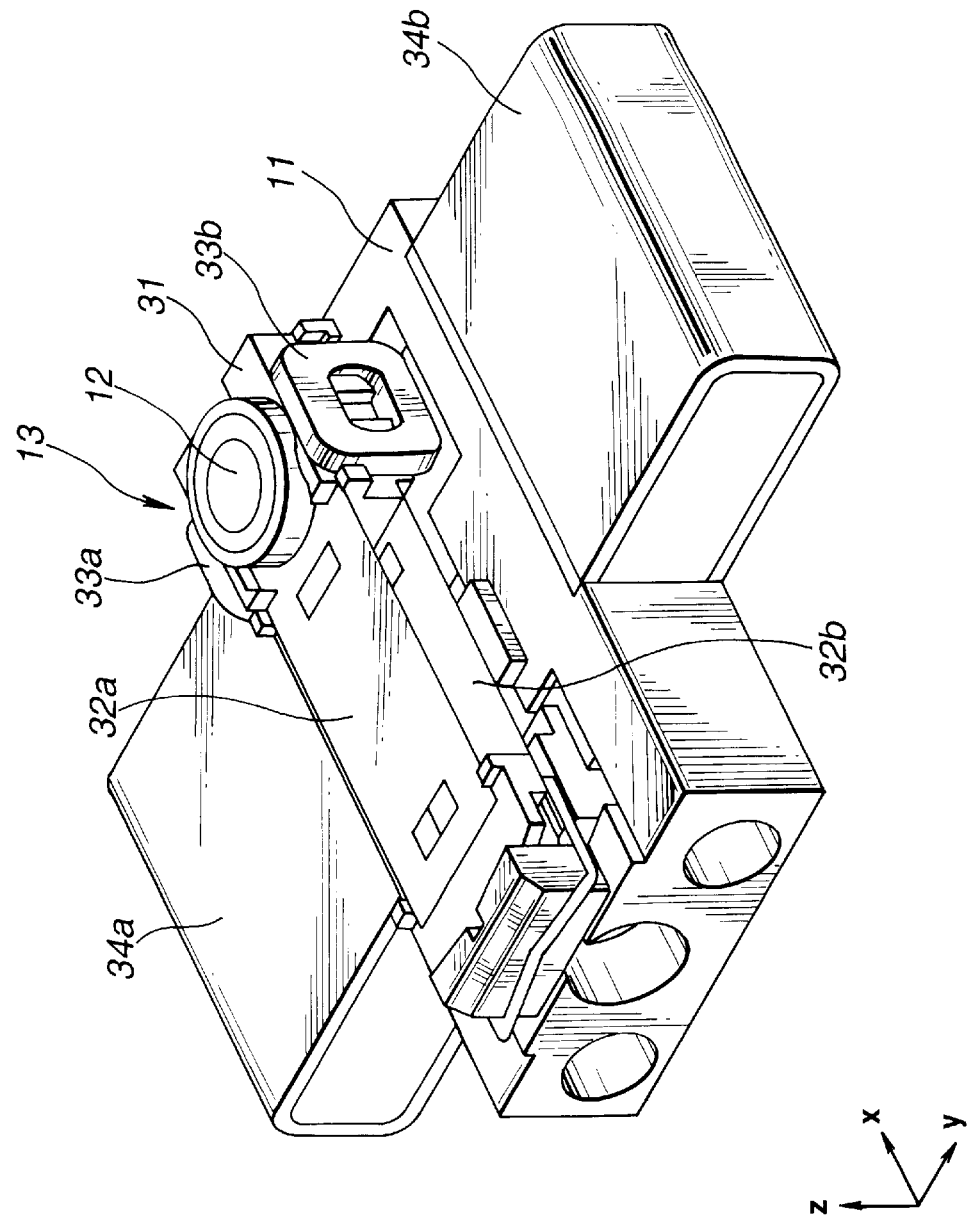

To be more specific, as shown in FIG. 2, the focus actuator 13 includes a holder 31 for immobilizing the objective lens 12, blade springs 32a and 32b for supporting the objective lens 12 so that the objective lens becomes movable in a focus direction and substantially stationary in a track direction, and focus coils 33a and 33b for driving the objective lens 12. The carriage 11 has the focus actuator 13 mounted on the top thereof and further includes tracking coils 34a and 34b jutting out from the flanks of the carriage for driving the carriage 11.

Figure 3:
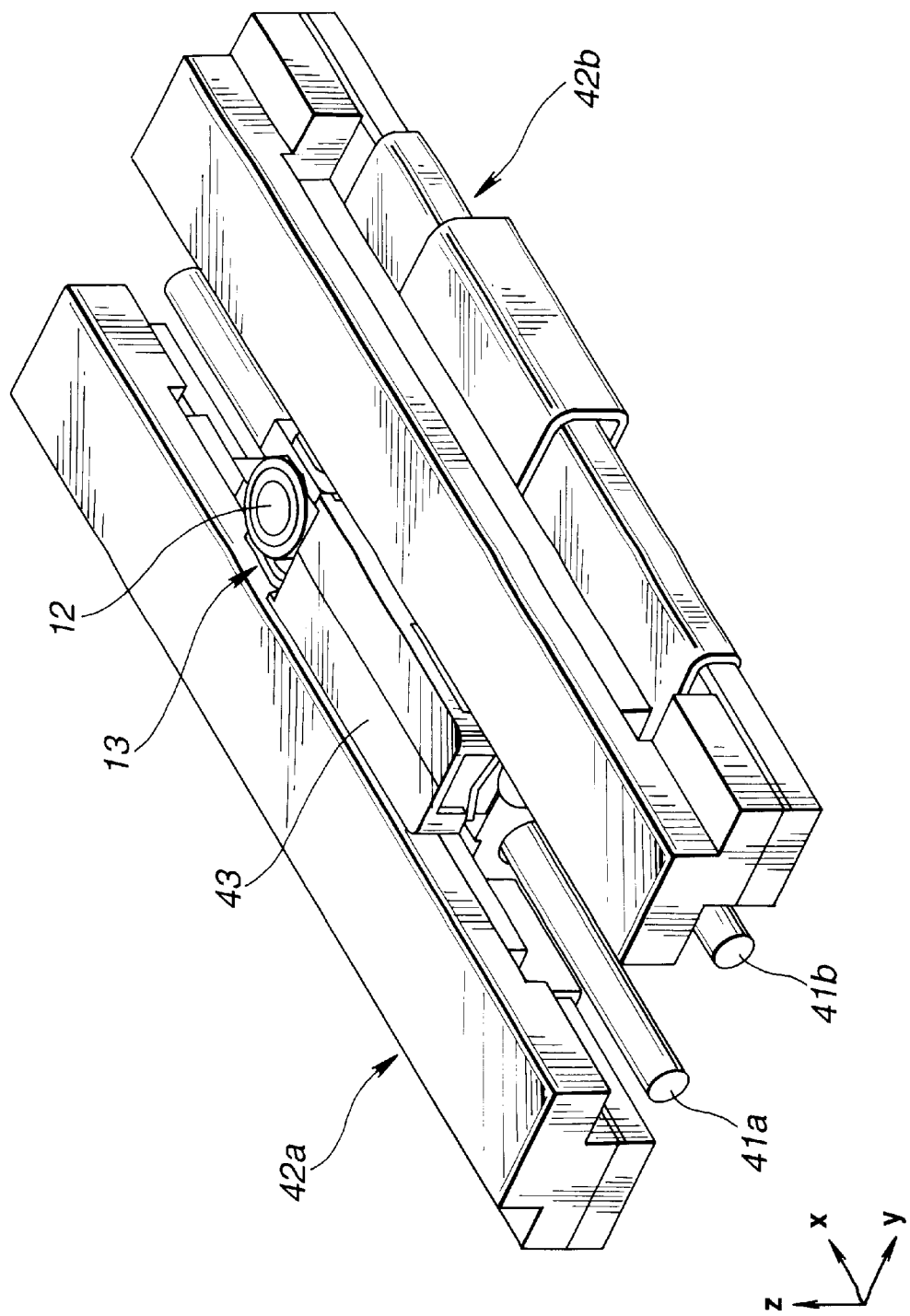

Once the carriage 11 and focus actuator 13 are, as shown in FIG. 3, assembled together with guide shafts 41a and 41b and magnetic circuits 42a and 42b, when the focus coils 33a and 33b are brought to conduction by a focus control circuit that is not shown, the focus actuator 13 can be driven in the focus direction. When the tracking coils 34a and 34b are brought to conduction by the driver 24, the carriage 11 can be driven in the track direction. Reference numeral 43 in FIG. 3 denotes a cover.

Figure 4:
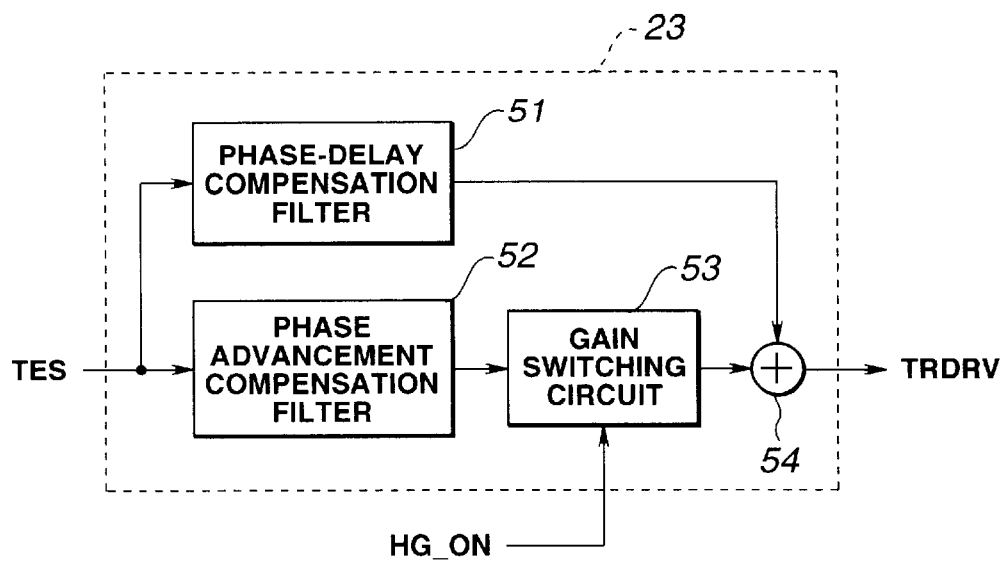

The phase compensation filter 23 includes, as shown in FIG. 4, a phase delay compensation filter 51 for compensating for a phase delay so as to improve tracking efficiency at a low frequency, a phase advancement compensation filter 52 for compensating for a phase advancement of the tracking error signal so as to stabilize a tracking operation, a gain switching circuit 53 serving as a tracking control correcting means for switching the gain of an output of the phase advancement compensation filter 52 to another on the basis of the result of prediction performed by the frictional state prediction circuit 22, and an addition circuit 54 for adding up an output of the phase delay compensation filter 51 and an output of the gain switching circuit 53. These components may be constructed as electric circuits or realized by software as a digital filter or the like to be run under a digital signal processor (DSP). The gain switching circuit 53 changes a gain produced thereby according to a control signal HG_ON indicating the result of prediction performed by the frictional state prediction circuit 22. When the signal HG_ON is low, a gain that is one time larger is produced. When the signal HG_ON is high, a gain that is 1.5 times larger is produced.

Figure 5:
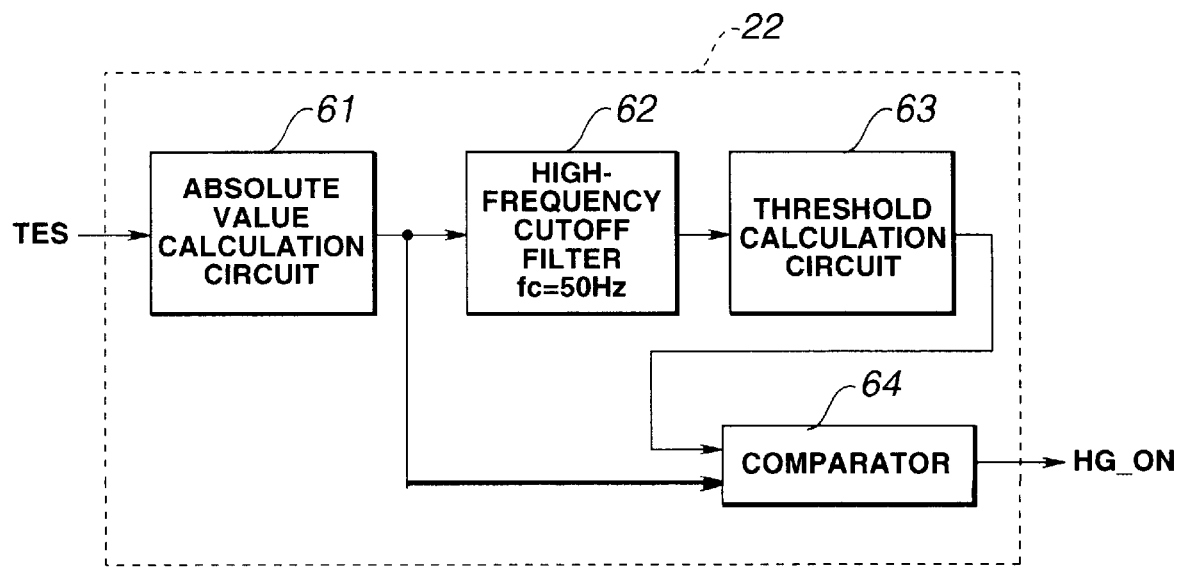

The frictional state prediction circuit 22 includes, as shown in FIG. 5, an absolute value calculation circuit 61 for calculating an absolute value of the tracking error signal, a low-pass filter 62 for extracting only low-frequency components from an output of the absolute value calculation circuit 61, a threshold calculation circuit 63 for calculating a threshold value on the basis of an output of the low-pass filter 62, and a comparator 64 for comparing the threshold value calculated by the threshold calculation circuit 63 with an output of the absolute value calculation circuit 61 and outputting the control signal HG_ON. These components may be constructed as electric circuits. However, it is practical to realize the frictional state prediction circuit by software to be run under a DSP.

Herein, the cutoff frequency of the low-pass filter 62 is 50 Hz. The threshold calculation circuit 63 outputs a value, which is three times larger than the output of the low-pass filter 62, as a threshold value. When an output of the absolute value calculation circuit 61 is larger than an output of the threshold calculation circuit 53, the comparator 64 drives an output thereof, that is, the control signal HG_ON to high.

Operation

Next, the operations of the tracking control unit 7 having the foregoing components will be described.

First, the spindle motor 3 is rotated at a given speed by a motor control circuit that is not shown, and the laser diode included in the stationary optical system 6 is allowed to emit laser light with given power by means of a laser control circuit that is not shown. A focus control circuit that is not shown controls the focus actuator 13 so that the light beam 4 focuses on an information track on the optical disk 2.

In this state, the TES detection circuit 21 produces a tracking error signal (TES) indicating by what magnitude a position irradiated with the light beam 4 is off the center of an information track. Normally, the tracking error signal assumes a zero level in relation to the center of an information track and to nearly a border between tracks, and has a sine wave that alternates with the displacement of the light beam 4.

The phase compensation filter 23 uses the phase advancement compensation filter 52 to compensate for a phase advancement of the tracking error signal for stabilizing a tracking operation, uses the phase delay compensation filter 51 to compensate for a phase delay thereof for improving tracking efficiency at a low frequency, and outputs a driving instruction signal TRDRV to the driver 24.

The driver 24 causes a current to flow into the tracking coils 34a and 34b in response to the signal TRDRV, and causes the carriage 11 to move in a direction in which a tracking error detected in the tracking error signal is corrected for. This operation is carried out continually, whereby tracking is controlled.

Figure 6:
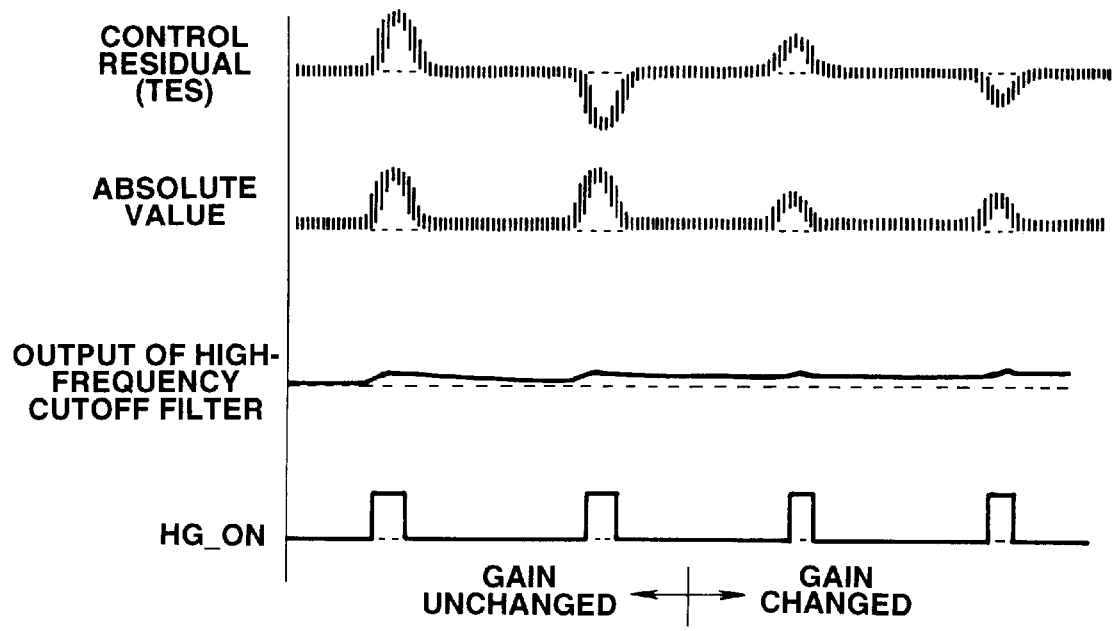

As shown in FIG. 6, friction is present between the guide shafts 41a and 41b and the carriage 11. When tracking is controlled normally, the tracking error signal cyclically represents a control residual derived from friction as shown in "control residual (TES)" in FIG. 6. In FIG. 6, various noises contained in the tracking error signal are depicted with a bold line for convenience sake.

In the frictional state prediction circuit 22, the absolute value calculation circuit 61 calculates the absolute value of the level of the tracking error signal. According to calculated absolute values, a wave like the one shown in "absolute value" in FIG. 6 is produced. The low-pass filter 62 then extracts low-frequency components alone from the wave, whereby a wave like the one shown in "output of low-pass filter" in FIG. 6 is produced. The threshold calculation circuit 63 calculates a value that is three times larger than the level of the wave. The comparator 64 compares the value with the absolute value of the tracking error signal. The control signal HG_ON shown in "HG_ON" in FIG. 6 is output while being driven high according to the timing that the absolute value of the tracking error signal is larger than the threshold value. In other words, the frictional state prediction circuit 22 predicts a period of static friction by detecting a local increase in tracking error signal derived from static friction, and outputs the control signal HG_ON.

When the control signal HG_ON is driven high, the gain switching circuit 53 in the phase compensation filter 23 produces a gain that is 1.5 times larger than a normal gain. Consequently, a gain produced by the phase compensation filter 23 increases by 3 dB transiently. A control residual derived from friction is suppressed with the increase in gain to be produced by a servo system. As shown in the right half of FIG. 6 (compared with the left half of "absolute value" in FIG. 6 with the right half thereof), the residual derived from friction can be made smaller by a value proportional to the increase in gain (that is to say, the gain switching circuit 53 has corrected tracking control).

When the increase in gain causes the tracking control system to tend to oscillate, the absolute value calculation circuit 61 provides a larger output. The low-pass filter 62 allows low-frequency components alone of the output to pass, and the threshold calculation circuit 63 provides a larger threshold value. The control signal HG_ON that is an output of the comparator 64 does not therefore go high. The gain returns to the normal value, whereby oscillation ceases. Thus, it will not take place that the tracking control system oscillates because of the adverse effect of this method.

Advantage

As mentioned above, according to this embodiment, a period during which a control residual increases transiently because of friction between the guide shafts 41a and 41b and the carriage 11 is predicted by the frictional state prediction circuit 22. During the period, correction is made to increase a gain to be produced by the phase compensation filter 23. The control residual derived from friction can therefore be suppressed effectively.

For calculating a threshold value in the threshold calculation circuit 63, in this embodiment, an output of the low-pass filter 62 is tripled. When a smaller gain is produced in order to make a threshold value smaller, the timing of raising the gain comes earlier. This is quite advantageous.

However, since a smaller threshold may lead to oscillation, the threshold value should preferably be set to a value that is twice to four times larger than an output of the low-pass filter 62. Instead of calculating a threshold value by multiplying the output of the low-pass filter 62 by a coefficient, the threshold value may be calculated by adding a given offset to the output of the low-pass filter. Furthermore, instead of multiplying the output of the low-pass filter 62 by a coefficient or adding an offset to the output thereof, a minimum value and maximum value may be determined and the threshold value may be varied within the minimum and maximum values.

Moreover, in this embodiment, the cutoff frequency of the low-pass filter 62 is 50 Hz. The cutoff frequency may be set to another value. However, when the cutoff frequency becomes too high, a control residual derived from friction increases. Anyhow, a threshold value becomes so high as to permit relatively high-frequency components. This hinders accurate judgment. The cutoff frequency of the low-pass filter 62 should therefore be set to a value equal to or smaller than a value that is about five times larger than the number of rotations of the disk, or should preferably be set to a value that is equal to or smaller than the number of rotations of the disk.

As for the method of predicting a frictional state between the guide shafts 41a and 41b and the carriage 11, various methods are conceivable aside from the one in this embodiment. For example, the relationship between a driving signal and tracking error signal may be referenced. Based on the phase of the tracking error signal relative to the driving signal, it is predicted whether or not a frictional state is attained. This will be described more particularly in relation to the second embodiment. In this embodiment, an absolute value of the tracking error signal is input to the low-pass filter having a low cutoff frequency for the purpose of judgment. Even in this form, a variant can be constructed: that is, another low-pass filter is installed on a stage preceding the absolute value calculation circuit in order to attenuate noise components; or a high-pass filter is installed in order to cut off dc components.

For correction to be performed when a frictional state is identified, in this embodiment, a gain to be produced by the phase advancement compensation filter 52 is increased. Alternatively, a gain to be produced by the phase delay compensation filter 51 may also be increased or a gain to be produced by the driver 24 or TES detection circuit 21 may be increased. An increment by which a gain is increased may be made larger. Moreover, instead of switching gains in two steps, gains may be switched in a larger number of steps or a gain may be varied continuously. Alternatively, instead of increasing a gain, a pulsating current may be supplied to the coils according to the polarity of the tracking error signal indicating occurrence of a residual.

Second Embodiment

In an optical disk drive, since a disk is rotating at a high speed, the disk vibrates at the rotational frequency. The vibration is observed as a disturbance in a position signal. In this case, external force such as frictional force working on an actuator leads to a disturbance in a control system and causes a track tracking error.

As a means for compensating for such a disturbance, the employment of a disturbance observer is known. For example, the thesis entitled "Application of Disturbance Observer to Head Positioning Control System for Magnetic Disk Drive" (Collection of Theses, Japanese Society for Measurement and Automatic Control, Vol. 30, No. 7, P. 828–835, 1994) reads that a disturbance observer for inferring a disturbance from a position error signal and a driving signal produced by an actuator is constructed, and an output signal of the disturbance observer is added to the driving signal in order to compensate for the disturbance.

For intensifying an effect of suppressing a disturbance, it is necessary to raise a frequency band to which a disturbance observer is sensitive for prediction. The necessity rises, in particular, when the disturbance observer is designed to be effective in predicting a disturbance stemming from static friction. However, when an actuator resonates in a high-order mode, if a frequency band to which the disturbance observer is sensitive is raised in order to improve prediction performance, a frequency component affected by the high-order mode of resonance appears in an output of the disturbance observer. The frequency band to which the disturbance observer is sensitive is therefore limited by the resonance in a high-order mode.

In the Japanese Unexamined Patent Publication No. 5-134707, a notch filter is added to an output stage of the disturbance observer. Thus, the influence of the resonance in a high-order mode is eliminated and the frequency band to which the disturbance observer is sensitive for prediction is raised.

Figure 14:
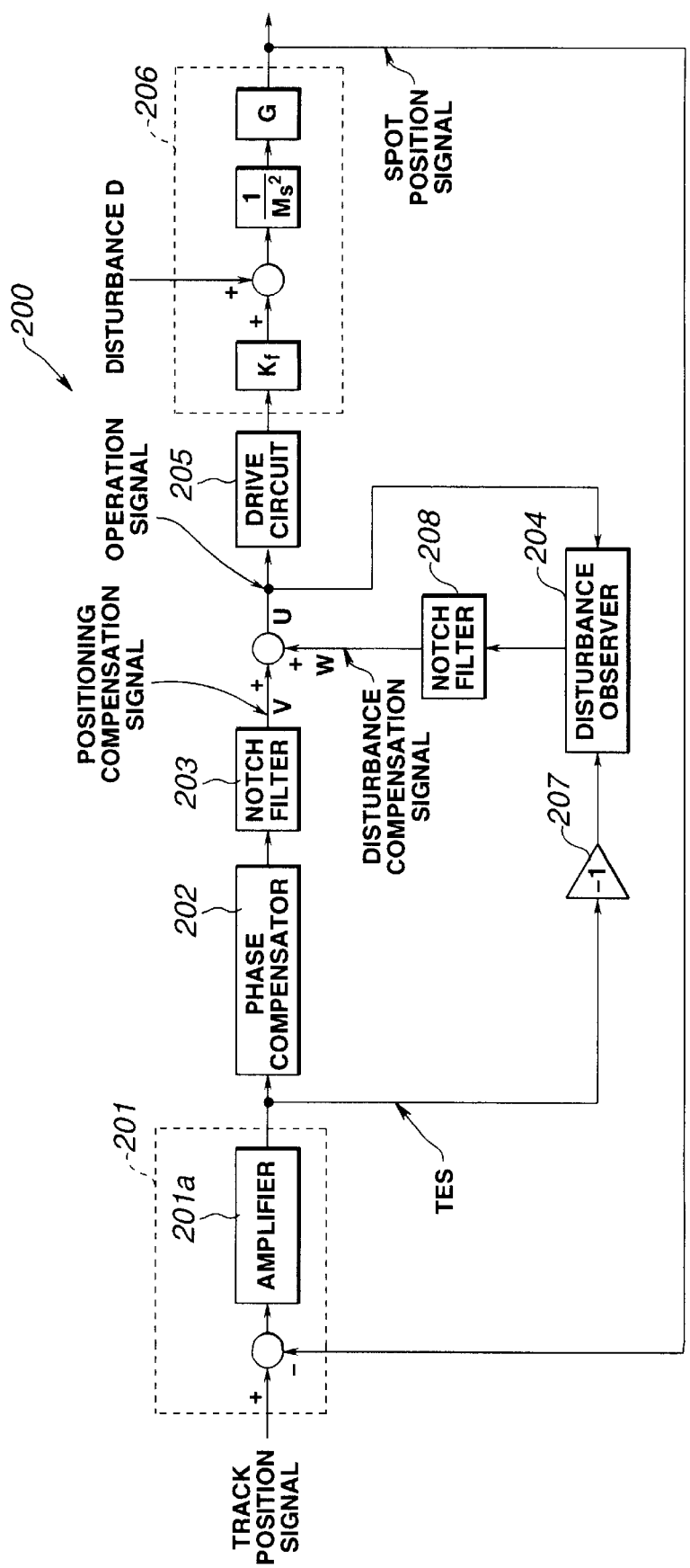
FIG. 14 is a block diagram showing the configuration of a conventional head positioning control unit.

A conventional head positioning control unit for an optical disk drive will be described in conjunction with the drawings. FIG. 14 is a block diagram showing the conventional head positioning control unit for an optical disk drive.

As shown in FIG. 14, in a conventional head positioning control unit 200 for an optical disk drive, a position error that is an error between a track position signal indicating a center position of a track and a spot position signal is output as a tracking error signal (TES) by a tracking error signal detector 201. The tracking error signal detector 201 is composed of an optical system that is not shown and an amplifier 201a.

The tracking error signal (TES) is input to a first notch filter 203 via a phase compensator 202. An output of the first notch filter 203 is provided as a positioning compensation signal. The positioning compensation signal is added to a disturbance compensation signal sent from the disturbance observer 204, whereby an operation signal is provided. The operation signal is input to a tracking actuator 206 via a driving circuit 205.

The tracking actuator 106 is provided as an arithmetic operation expressed as Kf·G/Ms2 where Kf(N/A) denotes a constant for the thrust, 1/Ms2 denotes a transfer function in any mode other than a high-order mode of resonance, and G denotes a transfer function in the high-order mode of resonance.

The operation signal and the tracking error signal that is reversed in phase by a phase reverser 207 are input as a driving signal for the tracking actuator 206 and a position signal respectively to the disturbance observer 204. An output of the disturbance observer 204 is input to a second notch filter 208, whereby a disturbance compensation signal is produced.

The phase compensator 202, first notch filter 203, second notch filter 208, and disturbance observer 204 can be realized with analog circuits or with a digital filter using a microprocessor such as a digital signal processor (DSP).

Figure 15:
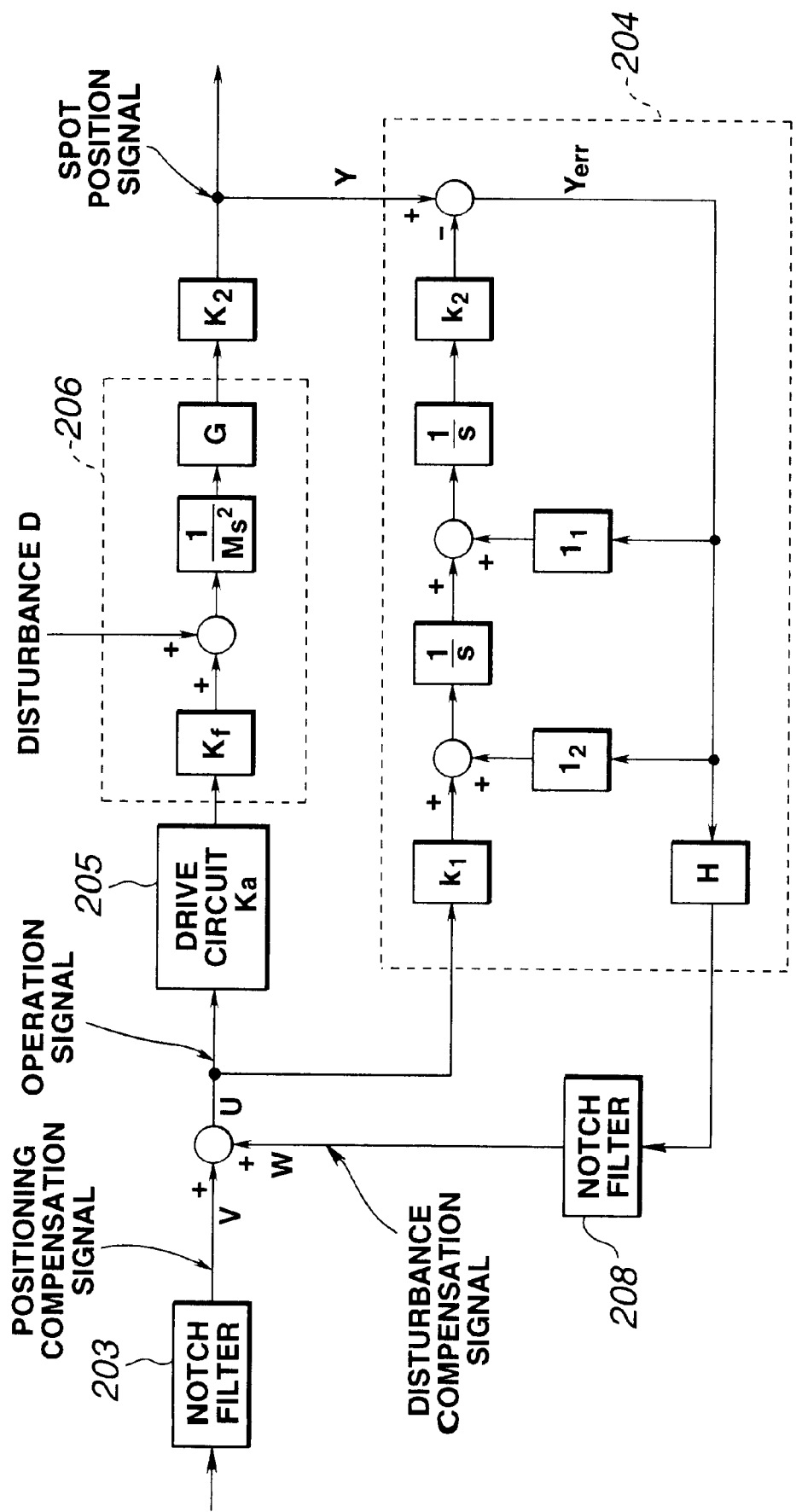
FIG. 15 is a functional block diagram showing a functional block equivalent to a control system in the positioning control unit shown in FIG. 14.

Next, the configuration of the disturbance observer 204 will be described in conjunction with FIG. 15. FIG. 15 is a diagram showing a functional block equivalent to a control system in the positioning control unit shown in FIG. 14. In FIG. 15, a portion encircled with a dashed line is the disturbance observer 204. Assuming that a Laplacian is s, the sensitivity in detecting the tracking error signal is K2 (V/m), a gain produced by a drive circuit 205 is Ka (A/V), a constant for a thrust provided by the tracking actuator 207 is N/A, and the mass of a movable portion having a head mounted thereon is M (kg), a transfer function in any mode other than a high-order mode of resonance is $1/Ms^2$, a transfer function in the high-order mode of resonance is G, and a disturbance is D (N).

The disturbance observer 204 is an observer for observing the same dimension in a continuous-time system that is characterized by a model of transfer functions each relating an operation signal unaffected by resonance in a high-order mode and a spot position signal as a function of frequency. Assuming that the model transfer function is $G_{act}$, $G_{act}$ is expressed as follows:

$$G_{act} = K1 \cdot K2 / Ms^2$$

Gains K1, l1, l2, and H are gains produced by the disturbance observer and expressed as follows:

$$K1 = Ka \cdot Kf$$

$$l1 = 2\zeta \cdot \omega / K2$$

$$H = -l2/K1$$

Assuming that an angular frequency of vibration to be suppressed is $\omega 1$, $\omega$ is set to a frequency several times higher than the angular frequency, and $\zeta$ is set to a frequency that is 0.5 to 4 times higher than the angular frequency.

Assuming that the actuator does not resonate in a high-order mode (that is, G equals to 1) and the second notch filter 208 is not included, a disturbance compensation signal $w_0$ is expressed as follows:

$$w_0 = -\omega^2 / (s^2 + 2\zeta \cdot \omega \cdot s + \omega^2) / K1 \cdot D$$

Figure 16:
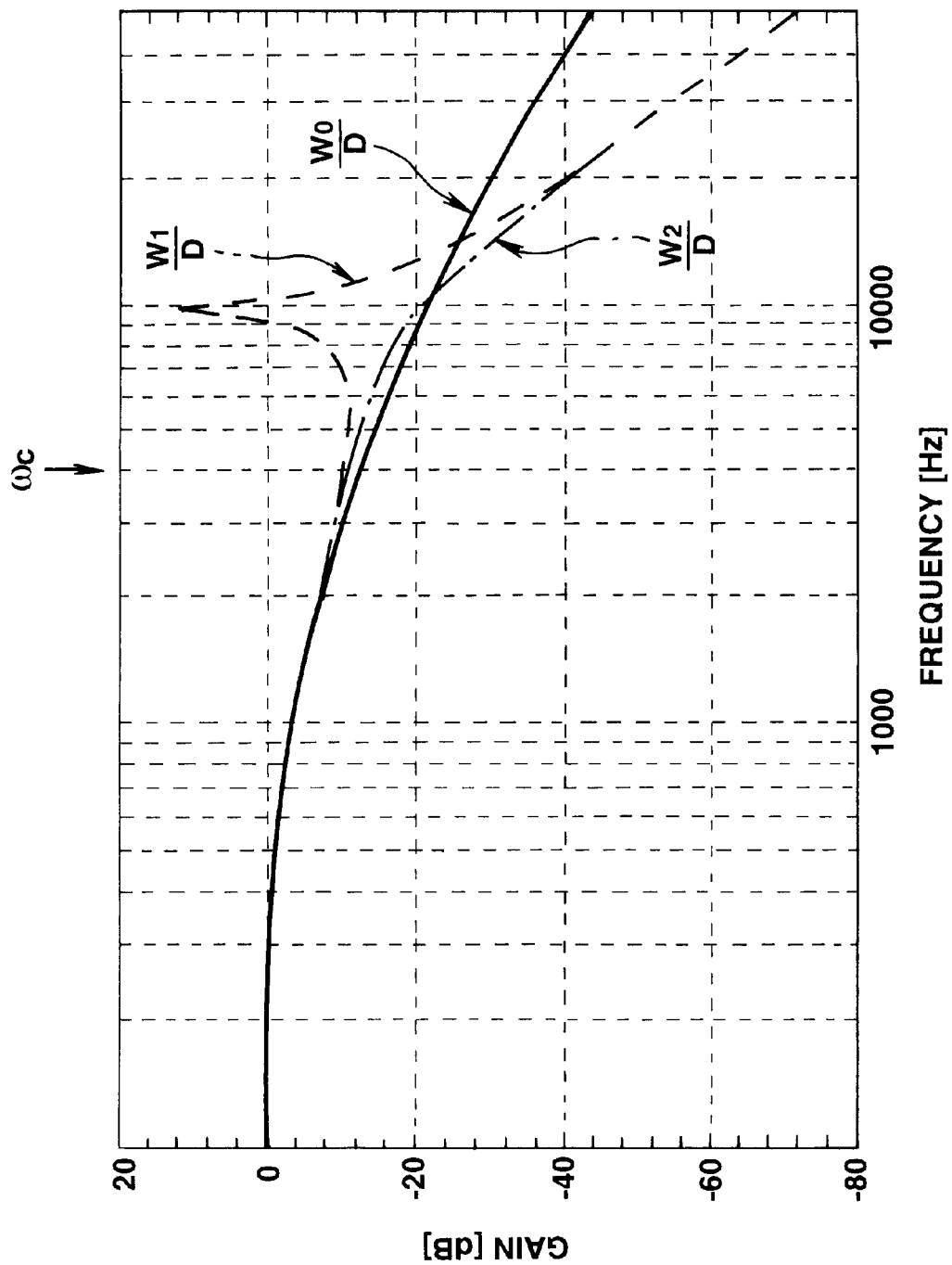
FIG. 16 is a graph showing characteristic curves indicating gains of a disturbance compensation signal and disturbance produced by the positioning control unit shown in FIG. 14 in relation to frequencies.
Figure 17:
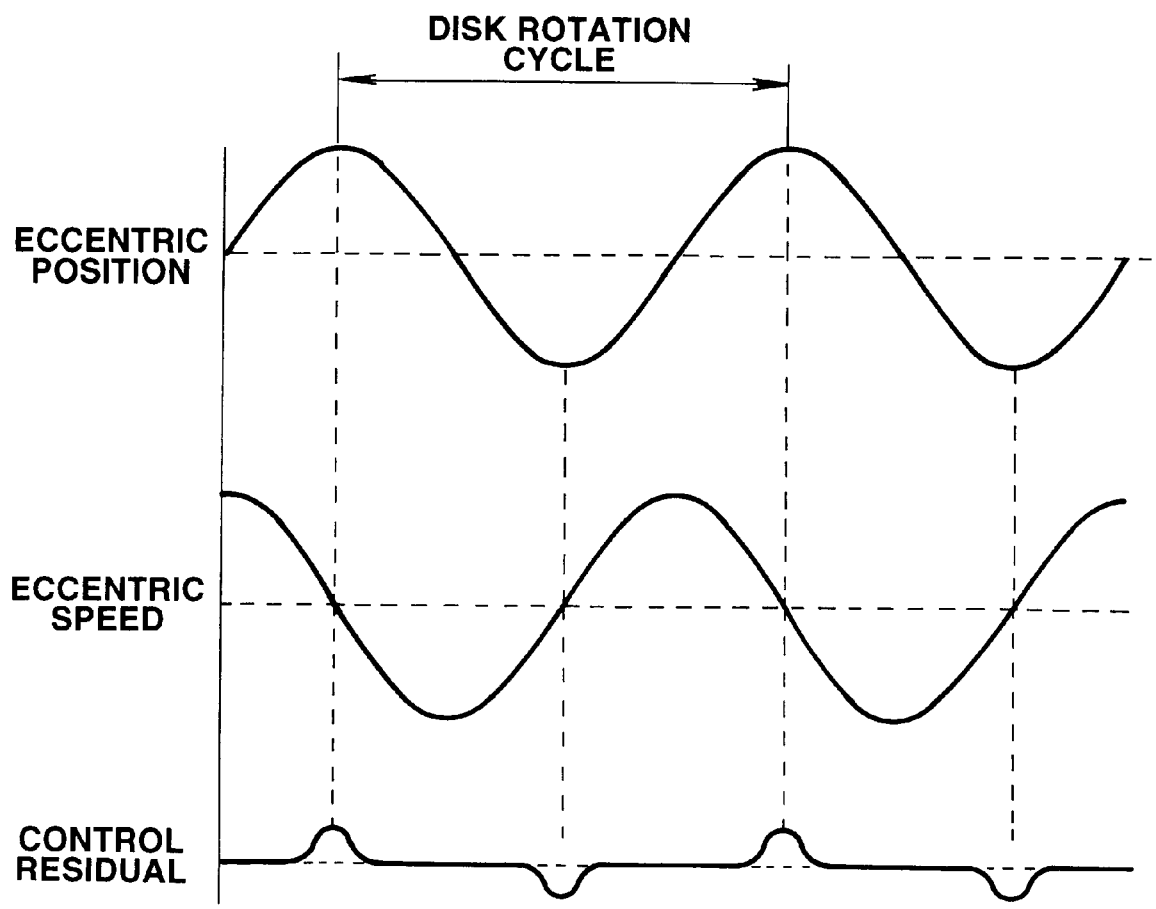
FIG. 17 is an explanatory diagram for explaining a control residual corresponding to an individual frictional distance caused by a conventional tracking control system for a optical disk drive.

The relationship of a gain $w_0/D$ to frequency is plotted as a solid line in FIG. 16.

Moreover, assuming that the actuator resonates in a high-order mode and the second notch filter 208 is included, a disturbance compensation signal is $w_1$. The relationship of a gain $w_1/D$ to frequency is plotted as a dashed line in FIG. 16. In this case, a variation in gain caused by resonance in a high-order mode is predicted as a disturbance according to the ideal model transfer function used to characterize the observer. A peak is therefore observed at a frequency equivalent to the resonant frequency of the actuator for a high-order mode of resonance.

Furthermore, when the tracking actuator 206 resonates in a high-order mode and the second notch filter 208 for attenuating frequencies including a frequency equivalent to the resonant frequency of the tracking actuator for a high-order mode of resonance is included (the configuration shown in FIG. 15), assuming that a disturbance compensation signal is $w_2$, the relationship of a gain $w_2/D$ to frequency is plotted as a dot-dash line in FIG. 16. In this case, a value reflecting influence of a high-order mode of resonance is excluded from values predictive of a disturbance. Disturbance prediction is therefore unaffected by resonance in a high-order mode. A frequency band within which a disturbance is predicted can therefore be raised.

However, when a notch filter for eliminating a frequency component affected by a high-order mode of resonance is installed on the output stage of the disturbance observer in order to raise the frequency band to which the disturbance observer is sensitive for prediction, the problems described below occur.

First of all, when a notch filter succeeding a disturbance observer is realized by software as an arithmetic operation, the addition of the notch filter brings about a time lag of an arithmetic operation. This leads to a reduction in tolerance in phase or gain of a tracking servo system. Consequently, although the frequency band to which the disturbance observer is sensitive for prediction is raised, the stability of the tracking servo system is impaired.

Moreover, filtering is normally carried out during interrupt processing performed at intervals of a sampling cycle. When the time required for the processing increases, if the processing does not terminate during a sampling cycle, it becomes necessary to decrease the sampling rate or include a fast arithmetic processor or the like. Even this leads to a reduction in tolerance in phase or gain or an increase in cost.

Furthermore, when the disturbance observer is realized with an analog circuit, the addition of a notch filter results in an increased number of circuit elements. The addition of new parts and an expansion of a necessary mounting space brings about an increase in cost.

An embodiment for solving these problems will be described below.

Configuration

In the second embodiment, an optical disk drive comprises a spindle motor for rotating an optical disk having information tracks thereon, a movable optical system for irradiating a light beam to the optical disk, a stationary optical system including a laser diode serving as a light source of the light beam for supplying laser light and a photodetector for detecting light returned from the optical disk using the movable optical system, and a tracking control unit for controlling tracking by detecting a tracking error signal (TES) in an output of the photodetector included in the stationary optical system, though these components are not shown.

A head positioning control unit of this embodiment is a unit to be included in the tracking control unit. Only the components relating to the head positioning control unit of this embodiment will be described below. The components unrelated to this embodiment are well-known. The description of the components will therefore be omitted.

Figure 7:
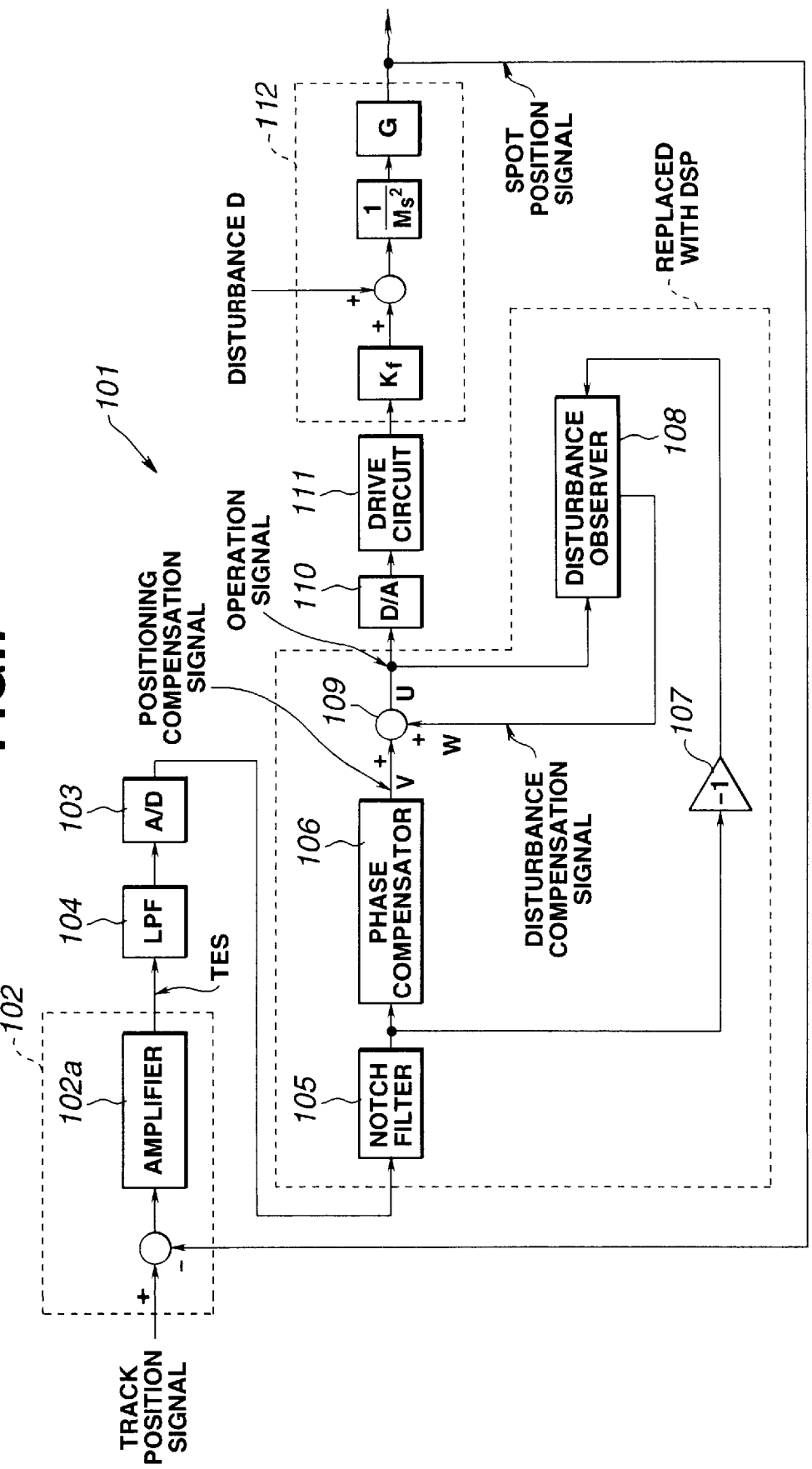
FIGS. 7 to 11 relate to the second embodiment of the present invention.

As shown in FIG. 7, in a head positioning control unit 101 of this embodiment, a tracking error signal detector 102 outputs a position error or an error between a track position signal indicating a center position of a track and a spot position signal indicating the position of a spot formed by a light beam as a tracking error signal (TES). The tracking error signal detector 102 is composed of an optical system that is not shown and an amplifier 102a.

The tracking error signal (TES) is input to a low-pass filter (LPF) 104 that is an anti-aliasing filter preceding an A/D converter 103. An output of the low-pass filter 104 is input to the A/D converter 103, and an output of the A/D converter 103 is input to a notch filter 105.

An output of the notch filter 105 is input to a phase compensator 106 and to a disturbance observer 108 via a phase reverser 107. A positioning compensation signal that is an output of the phase compensator 106 and a disturbance compensation signal that is an output of the disturbance observer 108 are added up by an adder 109, whereby an operation signal is produced. The operation signal is converted into an analog signal by a D/A converter 110, and then input to a drive circuit 111. An output of the drive circuit 111 is input to a tracking actuator 112.

The tracking actuator 112 is of a fine-and-coarse driving integrated type. In the tracking actuator 112, a constant for a thrust is expressed as Kf(N/A), the mass of a movable portion is expressed as M (kg), a transfer function in any mode other than a high-order mode of resonance is expressed as 1/Ms2, and a transfer function in the high-order mode is expressed as G. A disturbance is denoted with D and applied to the tracking actuator 112. The components of the notch filter 105, phase compensator 106, disturbance observer 108, and phase reverser 107 are realized with arithmetic operations to be carried out by a digital signal processor (DSP).

Now, the configuration of the tracking actuator 112 of a fine-and-coarse driving integrated type will be described briefly.

Figure 8:
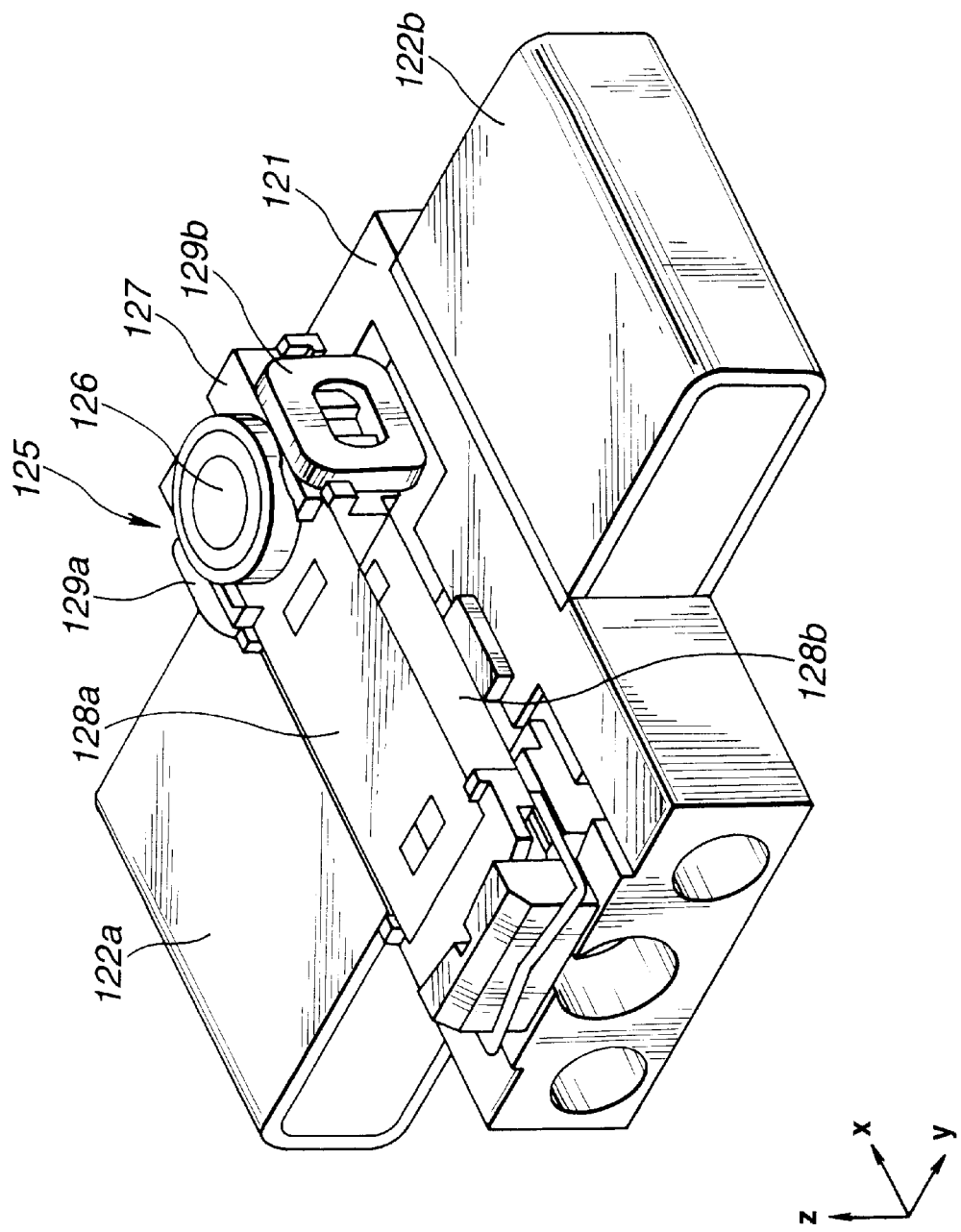
Figure 9:
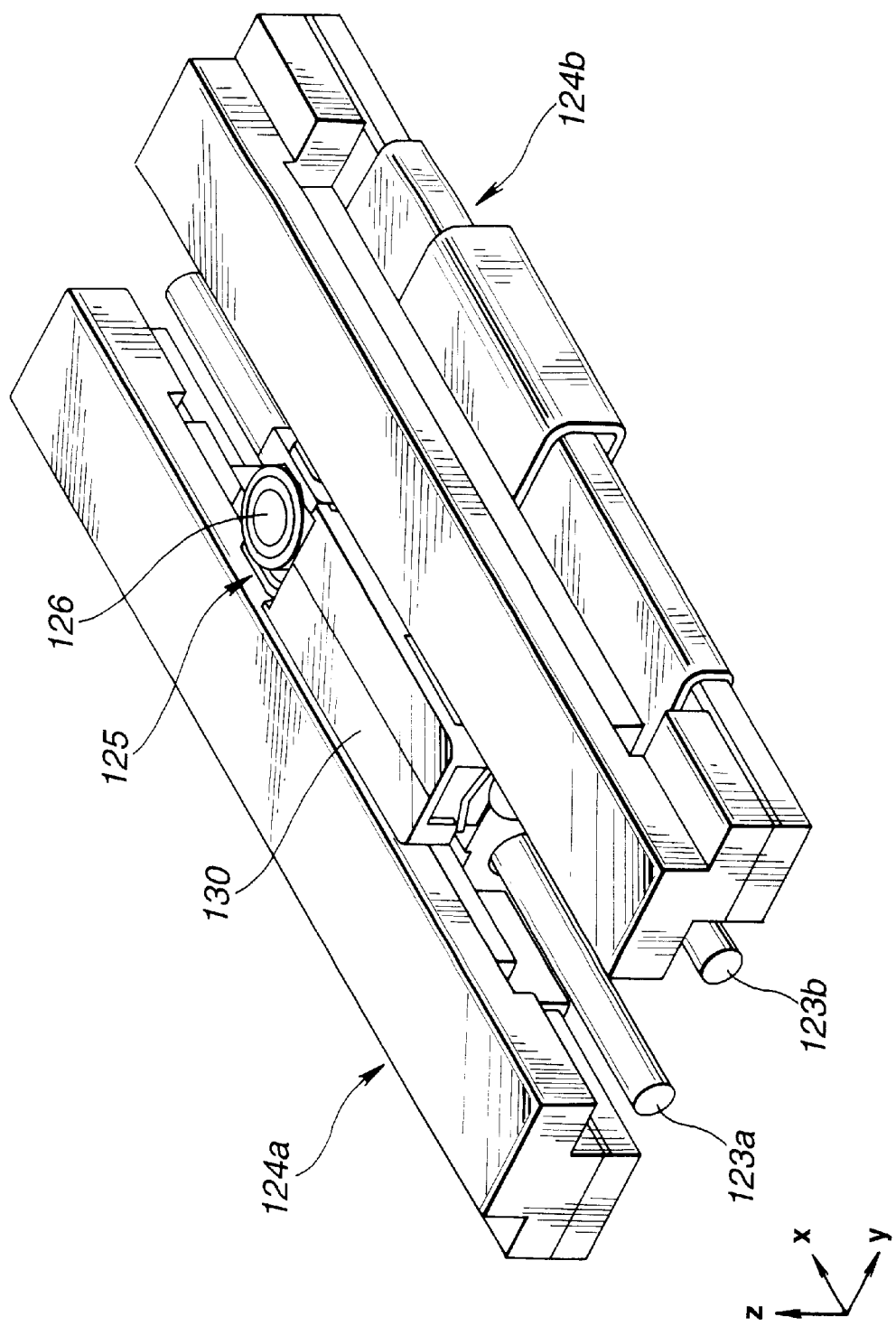

As shown in FIGS. 8 and 9, the tracking actuator 112 comprises a carriage 121 having a stationary optical system mounted thereon, tracking coils 122a and 122b for driving the carriage 121 in a track direction, guide shafts 123a and 123b, and magnetic circuits 124a and 124b.

When the tracking coils 122a and 122b conduct, the carriage 121 can be driven in the track direction. A focus actuator 125 is composed of a holder 127 for immobilizing an objective lens 126, blade springs 128a and 128b for supporting the objective lens 126 so that the objective lens 126 is movable in a focus direction (z direction in the drawings) and substantially stationary in a track direction, and focus coils 129a and 129b for driving the objective lens 126. The focus actuator 125 is mounted on the top of the carriage 121.

When the focus coils 129a and 129b conduct, the focus actuator 125 can be driven in a focus direction. In FIG. 9, there is shown a cover 130.

Figure 10:
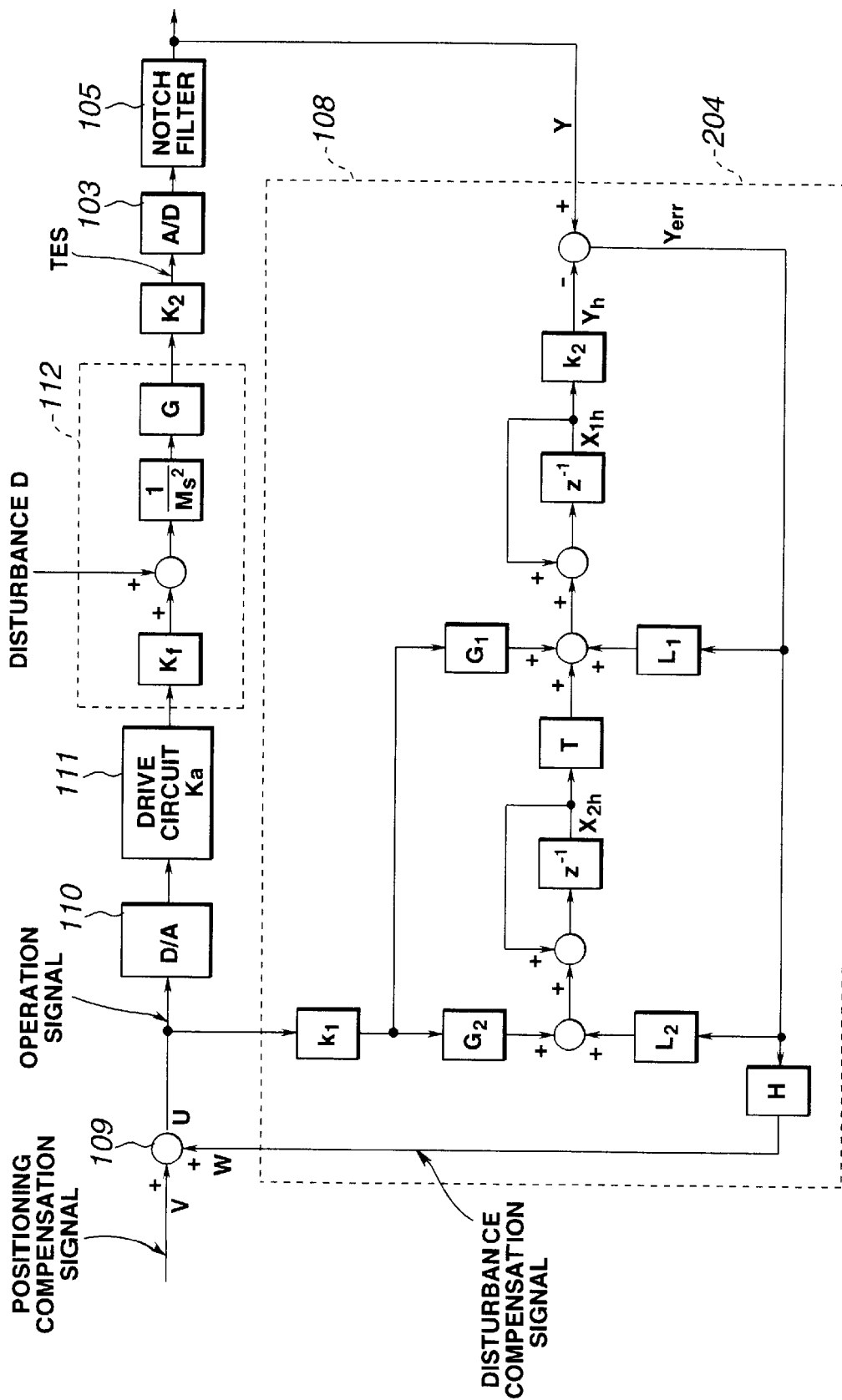

The configuration of the disturbance observer 8 is shown in FIG. 10 that is a diagram showing a functional block equivalent to a control system in the positioning control unit 101 shown in FIG. 7. An algorithm implemented in the DSP is provided in the form of a transfer function of a discrete-time system. In FIG. 10, $z^{-1}$ denotes an operator indicating a time lag of one sampling. The other components are provided as transfer functions of continuous-time systems. s denotes a Laplacian.

Gains k1, k2, G1, G2, L1, L2, and H1 produced by the disturbance observer 108 are gains of an observer for observing the same dimension in a discrete-time system characterized by a model of transfer functions each relating an operation signal and an output of the A/D converter. Assuming that a gain produced by the drive circuit 111 is Ka(A/V), a sampling cycle is T (s), gains produced by the D/A converter 110 and A/D converter 103 are $G_{DA}$ (V/digit) and $G_{AD}$ (digit/V), and the sensitivity in detecting the tracking error signal is K2 (V/m), the gains produced by the disturbance observer 108 are expressed as follows:

$k1=Ka$ $k2=K2 \cdot G_{AD}$ $G1=Kf \cdot G_{DA} \cdot T^2/(2M \cdot k1)$ $G2=Kf \cdot G_{DA} \cdot T/(M \cdot k1)$ $L1=2(1-q \cdot \cos \alpha)/k2$ $L2(1+q^2-2q \cdot \cos \alpha)/(T \cdot k2)$ $H1=-M \cdot L2/(Kf \cdot T \cdot Ka \cdot G_{DA})$ where $q=\exp(-\zeta \omega T)=\cos \{(\omega T(1-\zeta^2)^{1/2}\}$ where ω and ζ denote a prediction speed and an attenuation constant respectively.

Operation

Next, the operations of a tracking servo system including the positioning control unit 101 of this embodiment will be described in conjunction with FIGS. 7, 10 and 11.

Figure 11:
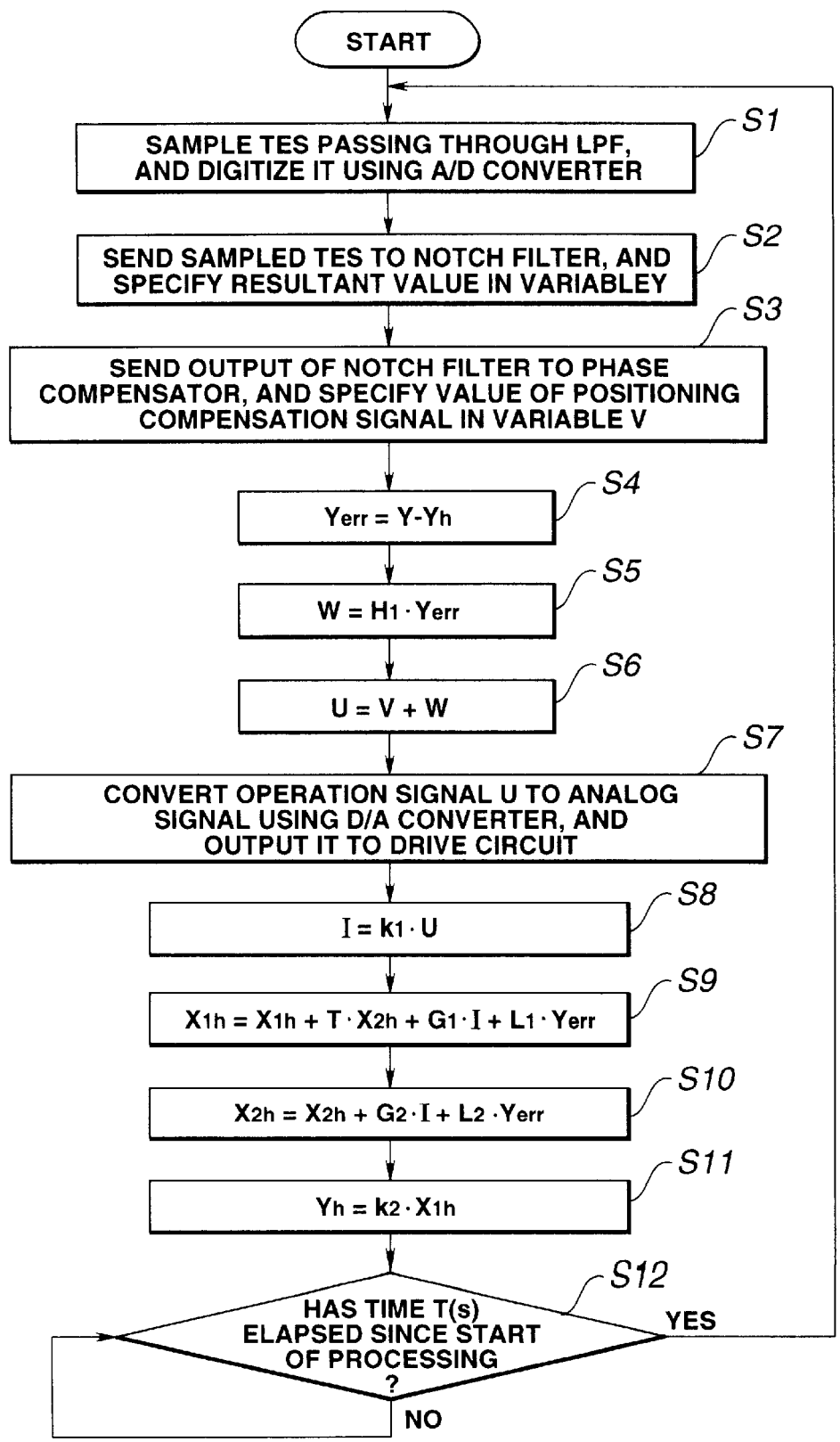

FIG. 11 is a flowchart describing an algorithm defining a sequence of arithmetic operations carried out by the DSP. The positioning control unit 101 first samples a tracking error signal (TES) that has passed through the low-pass filter 104 at step S1 as described in FIG. 11. The A/D converter 103 digitizes the sample signal. At step S2, an arithmetic operation defined as the notch filter 105 is carried out, and a solution is specified as a digital position signal in variable Y (See FIG. 10). At step S3, the output of the notch filter 105 is subjected to phase advancement compensation or the like by means of the phase compensator 106. A positioning compensation signal is specified in variable V.

At step S4, a digital predicted position signal Yh calculated as described later is subtracted from the digital position signal Y in order to calculate a digital prediction error signal Yerr. At step S5, the digital prediction error signal Yerr is multiplied by a gain H1 in order to produce a disturbance compensation signal W.

At step S6, the disturbance compensation signal W is added to variable V in which the positioning compensation signal is specified in order to calculate an operation signal U. At step S7, the operation signal U is converted into an analog signal by the D/A converter 110 and then input to the drive circuit 111. When this output is completed, calculation of a digital predicted position signal Yh is started in preparation for the next sampling.

At step S8, a solution of multiplication of the operation signal U by a value k1 is specified in variable I. At step S9, the following arithmetic operation is carried out:

$X1h=X1h+T \cdot X2h+F1 \cdot I+L1 \cdot Y_{err}$

At step S10, the following arithmetic operation is carried out:

$X2h=X2h+G2 \cdot I+L2 \cdot Y_{err}$

Thus, a digital predicted position signal X1h and digital prediction speed signal X2h are calculated. At step S11, the digital predicted position signal X1h calculated at step S11 is multiplied by a gain k1 in order to calculate a digital predicted position signal Yh (Yh=k2·X1h). At step S12, it is awaited until a time T (sec.) that is a sampling cycle elapses. When the time T (sec.) elapses, control is returned to step S1 so that the next tracking error signal can be sampled. The DSP repeats the same arithmetic operations at intervals of the sampling cycle T.

Noted is that the digital predicted position signal X1h and digital prediction speed signal X2h assigned to the right sides of the operational expressions to be calculated at steps S9 and S10 are values calculated at steps S9 and S10 during previous sampling, and that the digital predicted position signal X1h assigned to the right side of the operational expression calculated at step S11 is a value calculated at step S9.

Advantage

As mentioned above, external force to be applied to the tracking actuator 112 is predicted, and a signal proportional to the external force is applied as a disturbance compensation signal to the tracking actuator 112. The disturbance is therefore canceled out by the disturbance compensation signal.

In this embodiment, the tracking error signal (TES) that is a position signal to be input to the disturbance observer 108 has passed through the notch filter 105, and therefore has a frequency component thereof affected by a high-order mode of resonance removed therefrom. The disturbance observer 108 operates according to a transfer function similar to an ideal model relating an input unaffected by resonance in a high-order mode and an output. It will therefore not take place that the disturbance compensation signal contains a frequency component affected by the high-order mode of resonance because of an error of the model.

Furthermore, in a conventional configuration (described, for example, in Japanese Unexamined Patent Publication No. 5-134707), a new notch filter is added. In this embodiment, a notch filter in a tracking servo system is used in common. It will therefore not take place that the addition of a notch filter brings about a time lag of an arithmetic operation. Consequently, a head positioning control unit for an optical disk drive which is stable but does not bring about a reduction in tolerance in gain or phase can be constructed.

Moreover, even when a sampling cycle is shortened in order to suppress a time lag derived from arithmetic operations, since a new notch filter need not be added, the time required for the arithmetic operations will not be extended. It will therefore not take place that the arithmetic operations are not completed during a sampling cycle. This obviates the necessity of extending the sampling cycle or employing a faster DSP. Even when an actuator resonates in a high-order mode, it will not take place that the tolerance in stability of a servo system is nullified and cost increases. This results in a stable head positioning control unit for an optical disk drive.

Even with the use of an actuator whose resonant frequency for a high-order mode of resonance is low, such as, an actuator of a fine-and-coarse driving integrated type employed in this embodiment, a frequency band to which a disturbance observer is sensitive can be raised on a stable basis. A more inexpensive head positioning control unit for an optical disk drive can be constructed.

In this embodiment, a DSP is used to carry out arithmetic operations. An ordinary microprocessor will do as long as the processing time and cost are acceptable.

Third Embodiment

The third embodiment is substantially identical to the second embodiment. Only a difference will be described. Components identical to those in the second embodiment will bear the same reference numerals. The description of the components will be omitted.

Configuration

Figure 12:
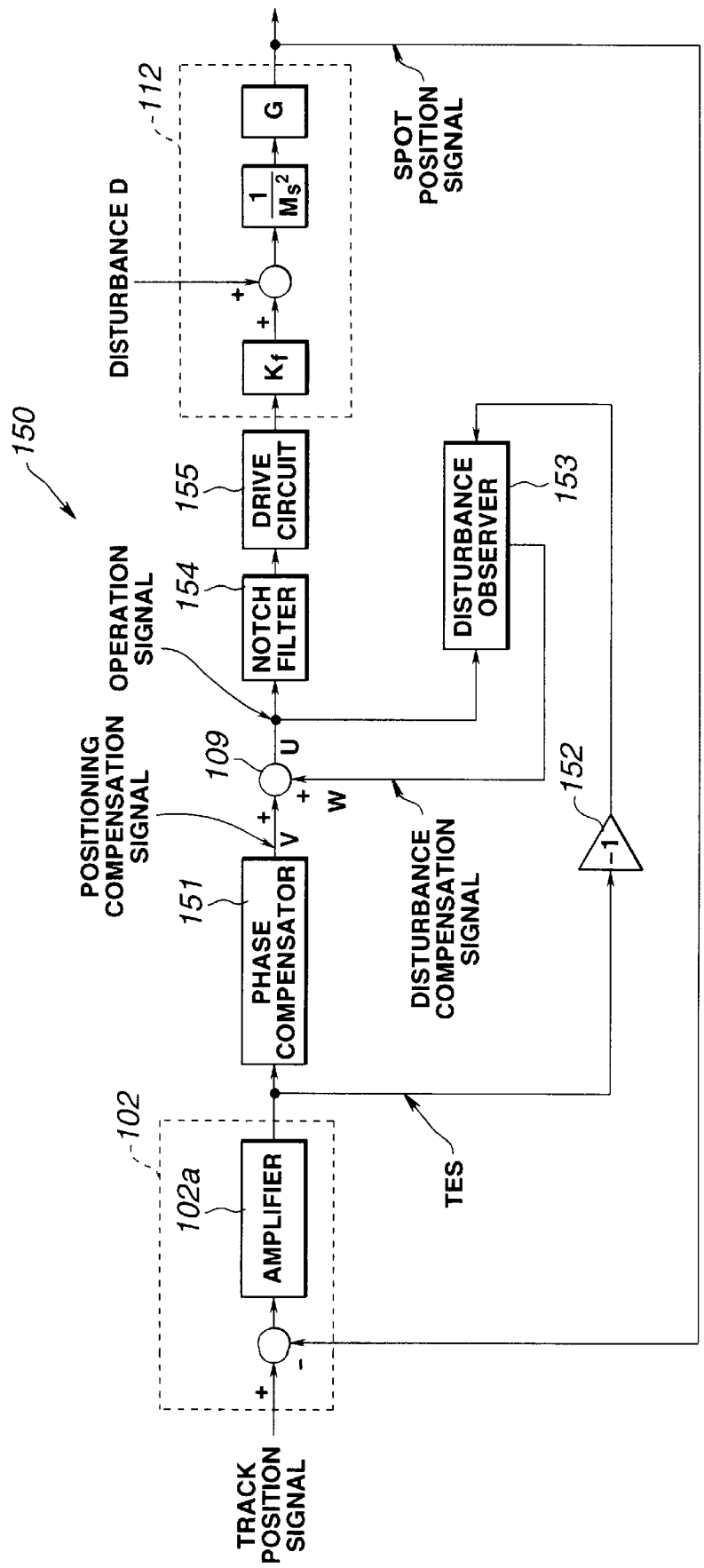
FIGS. 12 and 13 relate to the third embodiment of the present invention.

In a head positioning control unit 150 of this embodiment, as shown in FIG. 12, a tracking error signal detector 102 outputs a position error that is an error between a track position and spot position as a tracking error signal (TES). The tracking error signal (TES) is input to a phase compensator 151 and to a disturbance observer 153 via a phase reverser 152. A positioning compensation signal that is an output of the phase compensator 151 and a disturbance compensation signal that is an output of the disturbance observer 153 are added up by an adder 109, whereby an operation signal is produced. The operation signal is input to a notch filter 154. An output of the notch filter 154 is input to a drive circuit 155. An output of the drive circuit 155 is input to a tracking actuator 112.

The tracking actuator 112 is of a fine-and-coarse driving integrated type and has the same configuration as that in the second embodiment. Herein, D denotes a disturbance. The disturbance is applied to the tracking actuator 112. The notch filter 154, phase compensator 151, disturbance observer 153, and phase reverser 152 are realized with, for example, analog circuits in this embodiment. These circuits are each composed of an integrator and adder which are realized with operational amplifiers, a differential amplifier, and the like.

Operation

Figure 13:
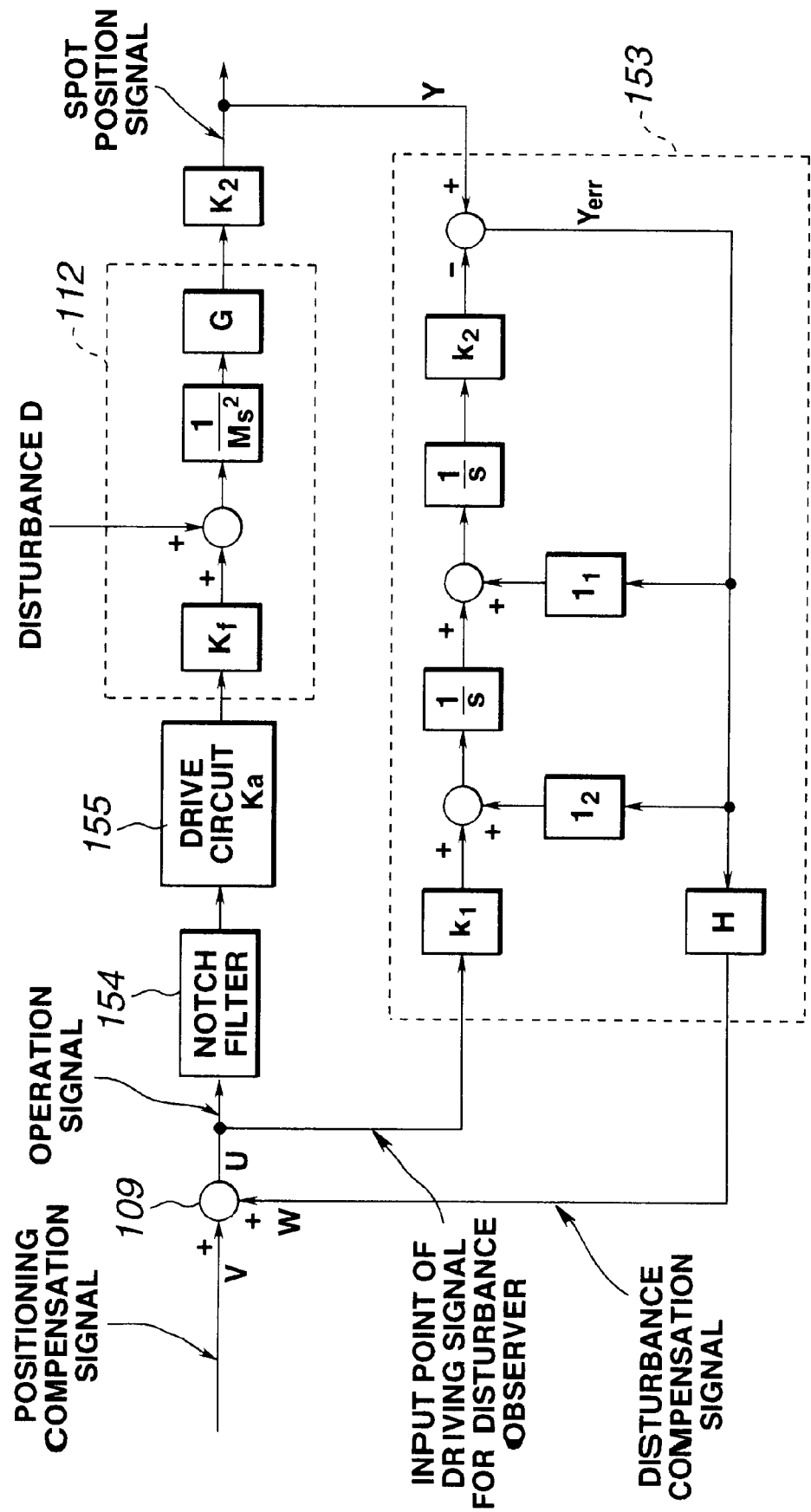

FIG. 13 is a diagram showing a functional block equivalent to a control system in the positioning control unit 150 shown in FIG. 12. The configuration of the disturbance observer 153 is identical to that in the conventional unit described in conjunction with FIG. 15. Assuming that a Laplacian is s, the sensitivity in detecting the tracking error signal (TES) is K2 (V/m), a gain produced by the drive circuit 55 is Ka (A/V), a constant for a thrust provided by the tracking actuator 112 is N/A, and the mass of a movable portion having a head mounted thereon is M (kg), a transfer function in any mode other than a high-order mode of resonance is $1/Ms^2$, a transfer function in the high-order mode of resonance is G, and a disturbance is D (N).

The disturbance observer 153 is an observer for observing the same dimension in a continuous-time system characterized by a model of transfer functions each relating an operation signal unaffected by resonance in a high-order mode and a spot position signal. Assuming that the model transfer function is Gact, $$Gact = K1 \cdot K2/Ms^2$$

Gains K1, l1, l2, and H are gains produced by the disturbance observer and expressed as follows:

$$K1 = Ka \cdot Kf$$

$$l1 = 2\zeta \cdot \omega/K2$$

$$l2 = \omega^2/K2$$

$$H = -l2/K1$$

Assuming that an angular frequency of vibration to be suppressed is ω1, ω is set to a frequency several times higher than the angular frequency and ζ is set to a frequency 0.5 to 4 times higher than the angular frequency.

Advantage

This embodiment is characterized in that the notch filter 154 for a tracking servo system is placed between an input node at which a driving signal for the disturbance observer 153 is input and the drive circuit 155.

Owing to this placement, a tracking error signal (TES) that is a position signal to be input to the disturbance observer 153 has a component thereof with a resonance frequency for a high-order mode of resonance removed therefrom while passing through the notch filter 154.

The disturbance observer 153 operates, like the one in the second embodiment, according to a transfer function similar to an ideal model that relates an input unaffected by resonance in a high-order mode and an output. Consequently, it will not take place that a disturbance compensation signal contains a frequency component affected by a high-order mode of resonance because of an error of a model.

In a conventional configuration (for example, the one described in Japanese Unexamined Patent Publication No. 5-134707), a new notch filter is included additionally. In this embodiment, a notch filter for a tracking servo system is used in common. It will therefore not take place that the number of parts increases due to addition of a notch filter. Without any concern about such drawbacks that cost increases and a space must be preserved for mounting a newly required part, a head positioning control unit for an optical disk drive which is stable and resistive to a disturbance can be constructed.

In the present invention, it is apparent that a wide range of different embodiments can be constructed on the basis of the present invention without a departure from the spirit and scope of the present invention. This invention is limited to the appended claims but not restricted to any specific embodiment.

What is claimed is:

1. A tracking control unit for an optical disk drive, comprising:

a carriage including a focus shifting means for supporting an objective lens so that said objective lens is movable in an optical-axis direction along which a light beam passes through said objective lens and substantially stationary in a direction substantially orthogonal to information tracks on an optical disk, and supported on guide members by a sliding bearing so that the light beam can be moved in a direction substantially orthogonal to said information tracks on said optical disk within a range within which said information tracks are present; coils for driving said carriage; a tracking error detecting means for detecting a tracking error signal indicating a displacement of the light beam from a center of an information track; a frictional state predicting means for inputting at least the tracking error signal and predicting a frictional state between said sliding bearing and guide members; and a tracking control correcting means for controlling tracking by feeding back the tracking error signal to said coils and correcting tracking control on the basis of an output of said frictional state predicting means, wherein said frictional state predicting means includes an absolute value calculating means for calculating an absolute value of the tracking error signal; a low-pass filter for inputting an output of said absolute value calculating means; a threshold calculating means for calculating a threshold value on the basis of an output of said low-pass filter; and a comparing means for comparing an output of said absolute value calculating means with an output of said threshold calculating means.

2. A tracking control unit for an optical disk drive according to claim 1, wherein said threshold calculating means calculates a threshold value by multiplying an output of the low-pass filter by a given coefficient.

3. A tracking control unit for an optical disk drive according to claim 2, wherein said threshold calculating means calculates a threshold value by multiplying an output of said low-pass filter by a coefficient that is twice to four times larger.

4. A tracking control unit for an optical disk drive according to claim 1, wherein the cutoff frequency of said low-pass filter is equal to or lower than a frequency that is five times higher than the rotational frequency of said optical disk.

* * * * *